(12) United States Patent
Tamakoshi et al.

(10) Patent No.: US 7,896,428 B2
(45) Date of Patent: Mar. 1, 2011

(54) VEHICLE BODY STRUCTURE

(75) Inventors: Koji Tamakoshi, Susono (JP); Naoya Kosaka, Susono (JP)

(73) Assignee: Toyota Jidosha Kabushiki Kaisha, Toyota-shi, Aichi-ken ( * ) Notice: Subject to any disclaimer, the term of this patent is extended or adjusted under 35 U.S.C. 154(b) by 474 days.

(21) Appl. No.: 11/883,186

(22) PCT Filed: Jan. 25, 2006

(86) PCT No.: PCT/JP2006/301605

§ 371 (c)(1),
(2), (4) Date: Jul. 27, 2007

(87) PCT Pub. No.: WO2006/080543

PCT Pub. Date: Aug. 3, 2006

(65) Prior Publication Data

US 2008/0122255 A1 May 29, 2008

(30) Foreign Application Priority Data

Jan. 28, 2005 (JP) .............................. 2005-022137
Jun. 13, 2005 (JP) .............................. 2005-172704

(51) Int. Cl.
*B62D 21/15* (2006.01)

(52) U.S. Cl. ................................................ 296/187.03

(58) Field of Classification Search ............ 296/187.03, 296/187.08, 187.09, 193.07, 193.09, 203.01, 296/203.02; 293/132, 133, 102
See application file for complete search history.

(56) References Cited

U.S. PATENT DOCUMENTS

| 6,193,274 B1 | 2/2001 | Brown et al. | |
| 7,380,830 B2 * | 6/2008 | Mitsui et al. | 280/784 |
| 7,669,688 B2 * | 3/2010 | Yamaguchi et al. | 180/312 |
| 2005/0077754 A1 * | 4/2005 | Tomita | 296/187.03 |
| 2007/0040414 A1 * | 2/2007 | Frederick et al. | 296/187.09 |
| 2007/0052258 A1 * | 3/2007 | Baccouche et al. | 296/187.03 |
| 2008/0238142 A1 * | 10/2008 | Braunbeck et al. | 296/187.03 |
| 2010/0032983 A1 * | 2/2010 | Kusaka | 296/187.03 |

FOREIGN PATENT DOCUMENTS

| DE | 19611934 | 4/1997 |
| EP | 1 332 949 | 8/2003 |
| JP | 56-118150 | 9/1981 |
| JP | 56-132144 | 10/1981 |
| JP | 56-160150 | 11/1981 |

(Continued)

*Primary Examiner*—H Gutman
(74) *Attorney, Agent, or Firm*—Finnegan, Henderson, Farabow, Garrett & Dunner, LLP

(57) ABSTRACT

A vehicle body structure that may be installed in a front part or in a rear part of a vehicle, includes a flexural portion disposed in respective side members extending in an anteroposterior direction of the vehicle and having a vertical bending strength smaller than that of other portions of the members. The vehicle body structure also includes a pendent portion hung on a lower part of the side member on an outer end side with respect to the flexural portion and having an anteroposterior bending strength larger than a bending strength of the flexural portion. The vehicle body structure enables the side members to absorb an impact with a simple configuration even in the event of a collision between vehicles with different bumper heights.

11 Claims, 17 Drawing Sheets

FOREIGN PATENT DOCUMENTS

| | | |
|---|---|---|
| JP | 62-54048 | 4/1987 |
| JP | S63-66698 | 12/1988 |
| JP | H5-009249 | 2/1993 |
| JP | 5-116645 | 5/1993 |
| JP | H5-043538 | 7/1993 |
| JP | 5-294142 | 11/1993 |
| JP | 5-294143 | 11/1993 |
| JP | 06-211091 | 8/1994 |
| JP | 06-67210 | 9/1994 |
| JP | 6-262944 | 9/1994 |
| JP | 08-091154 | 4/1996 |
| JP | 10-45022 | 2/1998 |
| JP | 11-321499 | 11/1999 |
| JP | 11-334648 | 12/1999 |
| JP | 3144093 | 1/2001 |
| JP | 2002-012109 | 1/2002 |
| JP | 2002-053076 | 2/2002 |
| JP | 2002-178862 | 6/2002 |
| JP | 2003-146242 | 5/2003 |
| JP | 2004-189035 | 7/2004 |
| JP | 2004-203202 | 7/2004 |
| JP | 2004-216975 | 8/2004 |
| JP | 2005-306161 | 11/2005 |
| WO | WO 02/50449 | 6/2002 |

\* cited by examiner

VEHICLE BODY STRUCTURE

TECHNICAL FIELD

The present invention relates to a vehicle body structure to be installed in a front part or in a rear part of a vehicle.

BACKGROUND ART

There are conventionally developed vehicle body structures enabling the side members to absorb impact even in the event that vehicles with different bumper heights collide with each other. For example, Japanese Patent Application Laid-Open No. 2003-146242 describes the structure in which a sub-frame is installed below the front side members and in which impact exerted on the sub-frame is transmitted to the side members to achieve impact absorption.

DISCLOSURE OF THE INVENTION

However, the conventional vehicle body structure as described above was complicated in configuration.

The present invention has been accomplished in view of the above-described circumstances and an object of the invention is to provide a vehicle body structure enabling the side members to achieve the impact absorption in a simple configuration even in the event that vehicles with different bumper heights collide with each other.

A vehicle body structure according to the present invention is a vehicle body structure to be installed in a front part or in a rear part of a vehicle, comprising: a side member extending in an anteroposterior direction of the vehicle; a flexural portion provided in the side member and having a vertical bending strength smaller than that of the other part of the side member in a longitudinal direction thereof; and a pendent member hung on a lower part of the side member and having an anteroposterior bending strength larger than the bending strength of the flexural portion. In the vehicle body structure according to the present invention, preferably, the pendent member is hung on the lower part of the side member on an outer end side with respect to the flexural portion.

In this vehicle body structure, the pendent member is pushed backward by a collision load when the host vehicle collides with another vehicle having a bumper at a lower height than that of the host vehicle. At this time, since the anteroposterior bending strength of the pendent member is larger than the vertical bending strength of the flexural portion, the flexural portion is reliably bent, so that the outer end side with respect to the flexural portion of the side member can be bent downward. This results in converting the energy of collision into energy to bend the flexural portion, whereby the impact absorption can be achieved in the simple configuration in the event of the collision with another vehicle having the bumper height lower than that of the host vehicle. Since the load can be transmitted backward through the downwardly bent side member, it is feasible to adequately achieve the absorption of impact by the side member.

Preferably, the pendent member is supported only at a base end thereof on the lower part of the side member. This configuration permits the outer end side of the side member to be promptly bent downward, without impeding displacement of the pendent member.

Preferably, the pendent member is constructed separately from the side member and in the same width as the side member, and a base end of the pendent member is fitted in a recess formed in a region from a side face to a lower face of the side member so as to be flush with the side face of the side member. This configuration permits a load exerted on the pendent member to be efficiently transmitted from the side face of the pendent member to the side face of the side member, whereby the outer end side of the side member can be bent downward.

Preferably, the pendent member is constructed integrally with the side member. This configuration permits a load exerted on the pendent member to be more securely transmitted to the side member than in a case where the pendent member constructed separately from the side member is bonded to the side member by welding or the like; therefore, the outer end side of the side member can be more reliably bent downward.

Preferably, the side member has a main body portion and an outer end portion coupled thereto, and the flexural portion includes a coupling portion between the main body portion and the outer end portion. This configuration can readily achieve downward bending of the outer end portion of the side member through breakage of the coupling portion by adjusting a coupling force in the coupling portion.

Preferably, the coupling portion comprises flanges provided in the main body portion and in the outer end portion, respectively, and a bolt-nut mechanism tightened through the flanges. This configuration can readily achieve the downward bending of the outer end portion of the side member through breakage of the coupling portion by adjusting rupture strength of the bolt-nut mechanism and the flanges.

This vehicle body structure preferably comprises a cross member laterally suspended between a pair of pendent members. This configuration permits a load to be transmitted through the cross member to the pendent members even in the event that the host vehicle collides at a part other than the pendent members in the vehicle width direction, whereby the outer end side of the side member can be bent downward.

Preferably, the pendent member has a receiver for receiving the cross member from the back thereof. This configuration permits a load exerted on the cross member to be more securely transmitted to the pendent members. The back of the cross member means the rear side in the anteroposterior direction of the vehicle when the present invention is applied to the front structure of the vehicle body, but it means the front side in the anteroposterior direction of the vehicle when the present invention is applied to the rear structure of the vehicle body.

The vehicle body structure according to the present invention preferably comprises a tension transmitting member connected between an end of the side member and the pendent member and arranged to transmit tension without transmitting compression. In this case, preferably, the flexural portion is provided on an outer end side with respect to the hung position of the pendent member in the side member.

According to this invention, the tension transmitting member for transmitting tension without transmitting compression is connected between the end of the side member and the pendent member; therefore, when a collision load is exerted on the tension transmitting member, for example, in the event that the host vehicle collides with another vehicle having a vehicle height lower than that of the host vehicle (particularly, in a case where the front side members of the other vehicle are lower than the front side members of the host vehicle), the tension transmitting member transmits the tension to the flexural portion of the side member to deform the flexural portion downward, whereby the impact absorption is efficiently achieved in the end part of the vehicle. When the collision load is exerted on the side member, for example, in the event that the host vehicle collides with another vehicle having the same vehicle height as the host vehicle (particularly, in a case where the front side members of the other vehicle have much the same height as the front side members of the host vehicle), the side member is compressively deformed, but no compression is transmitted from the side member to the pendent member through the tension transmitting member. For this reason, in the event of a mild collision, the pendent member is not deformed and repair is needed only in the end of the side member; therefore, repair cost can be reduced.

In the vehicle body structure according to the present invention, preferably, the side member has a buckling portion located on an outer end side with respect to a hung position of the pendent member and having a buckling strength smaller than that on the other side.

According to the present invention, when a collision load is exerted on the tension transmitting member, for example, in the event that the host vehicle collides with another vehicle having a vehicle height lower than that of the host vehicle, tension is transmitted to the buckling portion at the tip of the side member through the tension transmitting member to buckle the buckling portion. This buckling deformation results in achieving efficient impact absorption in the front part of the vehicle. On that occasion, the buckling portion is deformed, so as to prevent the pendent member from being deformed by tension. For this reason, in the event of a mild collision, there is no deformation in the pendent member and repair is needed only in the tip part of the side member; therefore, repair cost can be reduced.

In the vehicle body structure according to the present invention, preferably, the tension transmitting member is comprised of a wire.

According to the present invention as described above, the absorption of impact by the side member can be achieved in the simple configuration even in the event that the host vehicle collides with another vehicle with a bumper height different from that of the host vehicle.

BEST MODE FOR CARRYING OUT THE INVENTION

Embodiments of the present invention will be described below with reference to the accompanying drawings. In the description of the drawings the same elements will be denoted by the same reference symbols, without redundant description.

First Embodiment

Figure 1:
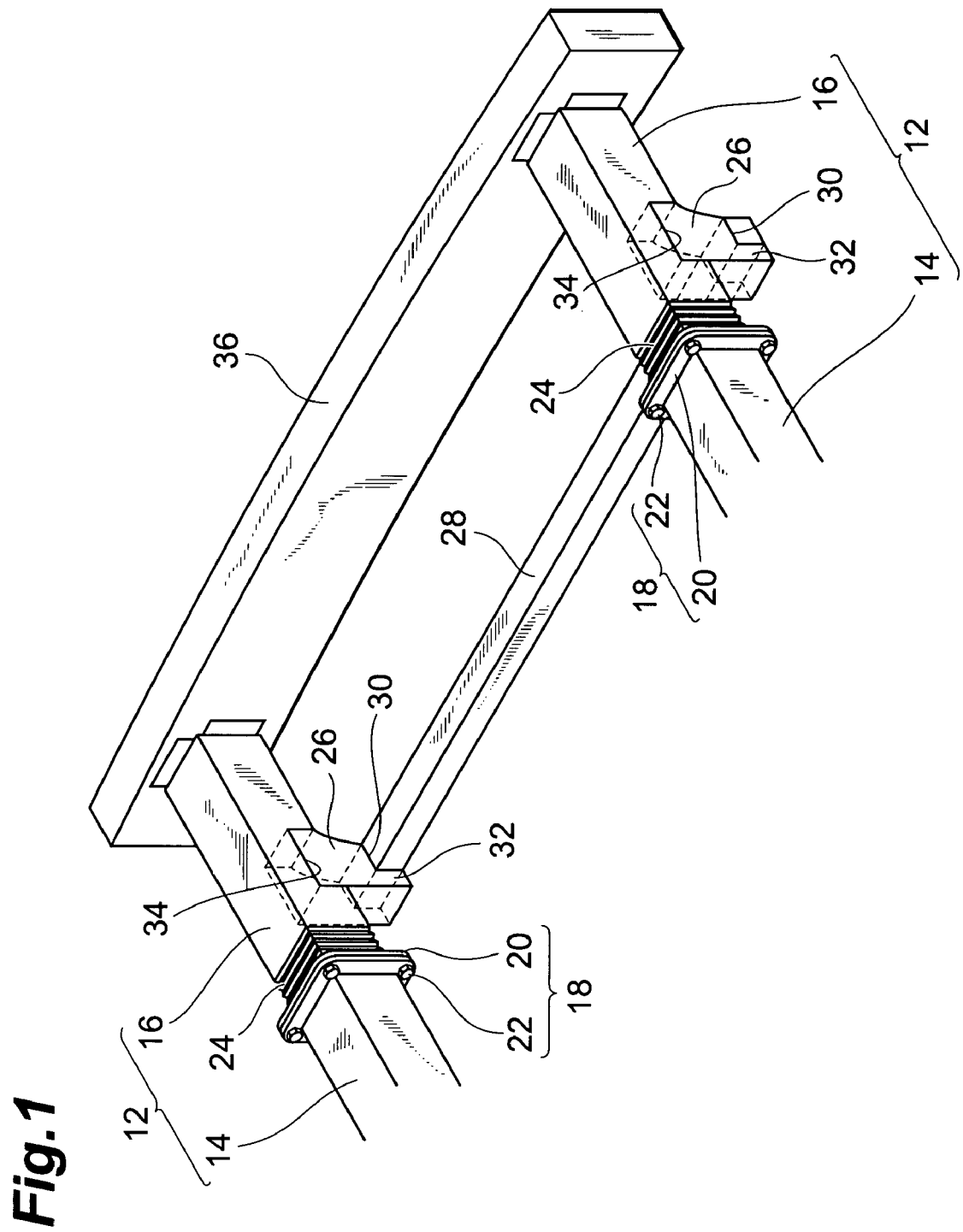
FIG. 1 is a perspective view showing a major part of a front structure of a vehicle body in a car according to the first embodiment.

FIG. 1 is a perspective view showing a major part of a front structure of a vehicle body in a car according to the present embodiment. As shown in FIG. 1, a pair of front side members 12 extending in the anteroposterior direction of the vehicle body are provided on the left and right sides of the front part of the vehicle body. Each front side member 12 has a main body portion 14 and a front end portion 16.

Each of the main body portion 14 and the front end portion 16 is a hollow member having a □-shaped cross section. These main body portion 14 and the front end portion 16 are coupled in a coupling portion 18. This coupling portion 18 has outward flanges 20 provided in the main body portion 14 and in the front end portion 16, respectively, and a bolt-nut mechanism 22 tightened through the flanges 20. The front end portion 16 is composed of a crash box and has a smaller proof strength against axial compression force than that of the main body portion 14. A flexural portion 24 is provided near the coupling portion 18 in the front end portion 16 and has a vertical bending strength smaller than that of any other part in the longitudinal direction of the front side member 12. This flexural portion 24 can be constructed, for example, of a plurality of beads as illustrated.

A pendent member 26 is hung on the lower part of each front end portion 16 in front of the flexural portion 24. The pendent member 26 is constructed separately from the front end portion 16. This pendent member 26 is a hollow member having a contour of an approximately rectangular parallelepiped shape and the same width as the width of the front end portion 16. This pendent member 26 has an inclined front surface and is provided with a step portion 30 for mounting of later-described cross member 28, in the lower part thereof. A vertically extending wall portion forming this step portion 30 functions as a receiver 32 for receiving the cross member 28 from the back thereof.

Figure 2:
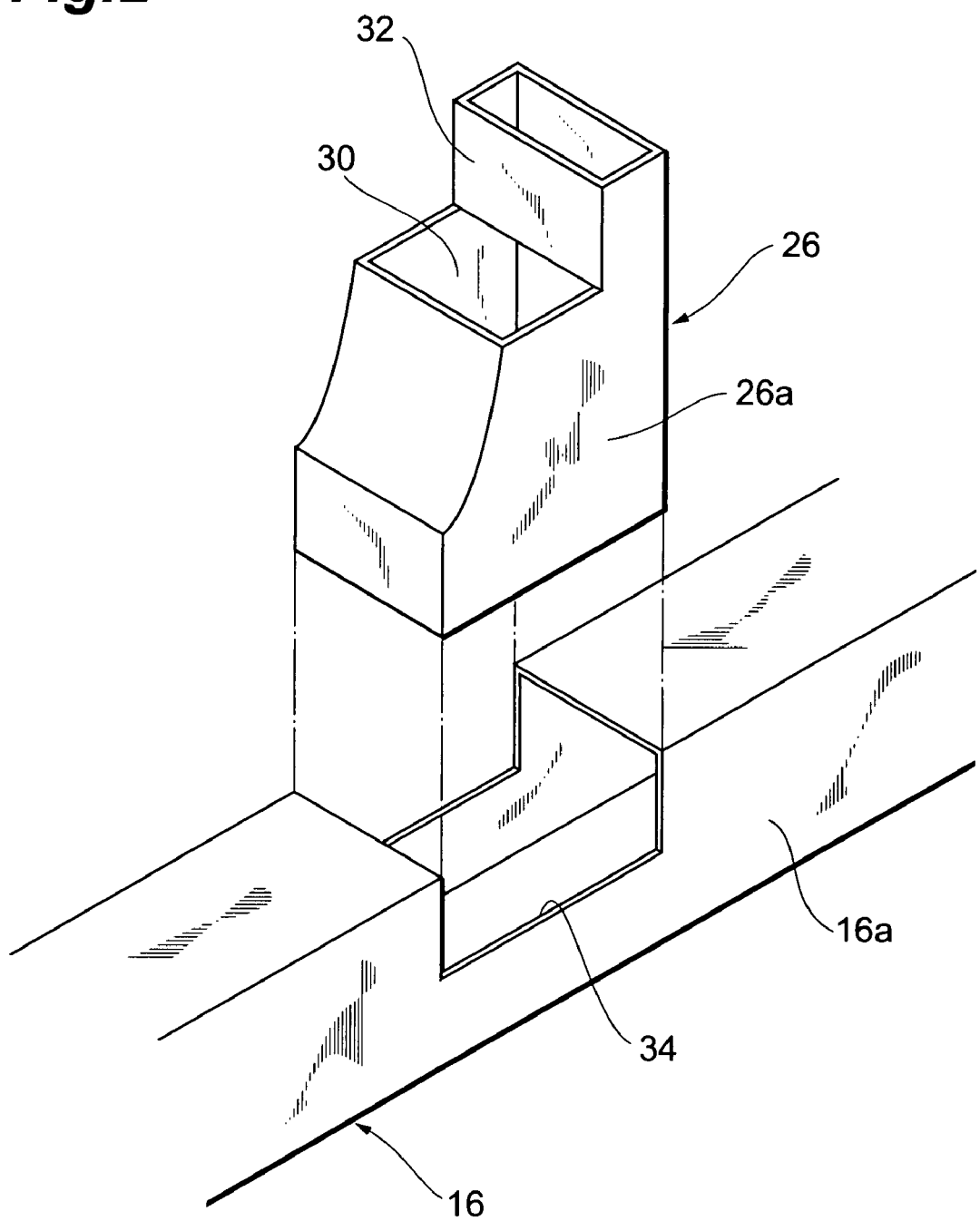
FIG. 2 is a drawing for explaining a joining relation between a front end part of a front side member and a pendent member.

A recess 34, which is formed by cutting the front end portion 16 in an approximately rectangular parallelepiped shape from side faces to a bottom face thereof as shown in FIGS. 1 and 2, is provided in the part of the front end portion 16 where the pendent member 26 is disposed, in front of the flexural portion 24. The base end of the above-described pendent member 26 is fitted in this recess 34 so that the side faces 16a of the front end portion 16 are flush with side faces 26a of the pendent member 26.

The cross member 28 extending in the width direction of the vehicle body is laterally suspended between these pair of pendent members 26. The left and right ends of this cross member 28 are mounted on the step portions 30 of the respective pendent members 26 and their receivers 32 receive the cross member 28 from the back thereof. Furthermore, a bumper reinforcement 36 is laterally suspended at the front ends of the pair of front side members 12.

The below will describe the action and effect of the front structure of the vehicle body according to the present embodiment.

Figure 3:
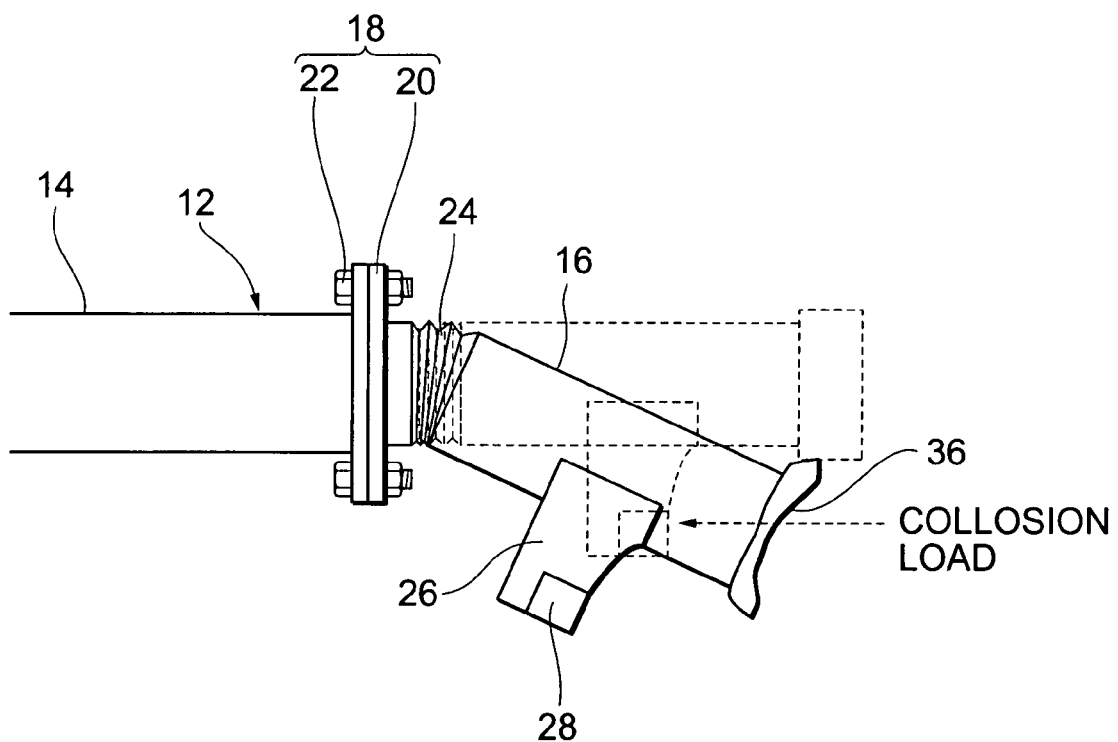
FIG. 3 is a drawing for explaining a state of deformation of a front end part of a front side member in the event that a collision load is exerted on a pendent member.

In this vehicle body structure, the anteroposterior bending strength of the pendent member 26 (which is the meaning including both the connection strength to the front side member 12 and the strength against bending of the pendent member 26 itself) is larger than the vertical bending strength of the flexural portion 24. Therefore, when a backward collision load is exerted on the pendent member 26 as indicated by a dashed line in FIG. 3, a downward bending moment acts to bend the flexural portion 24, so that the front end side anterior to the flexural portion 24 is bent downward, as indicated by solid lines in FIG. 3.

Figure 4:
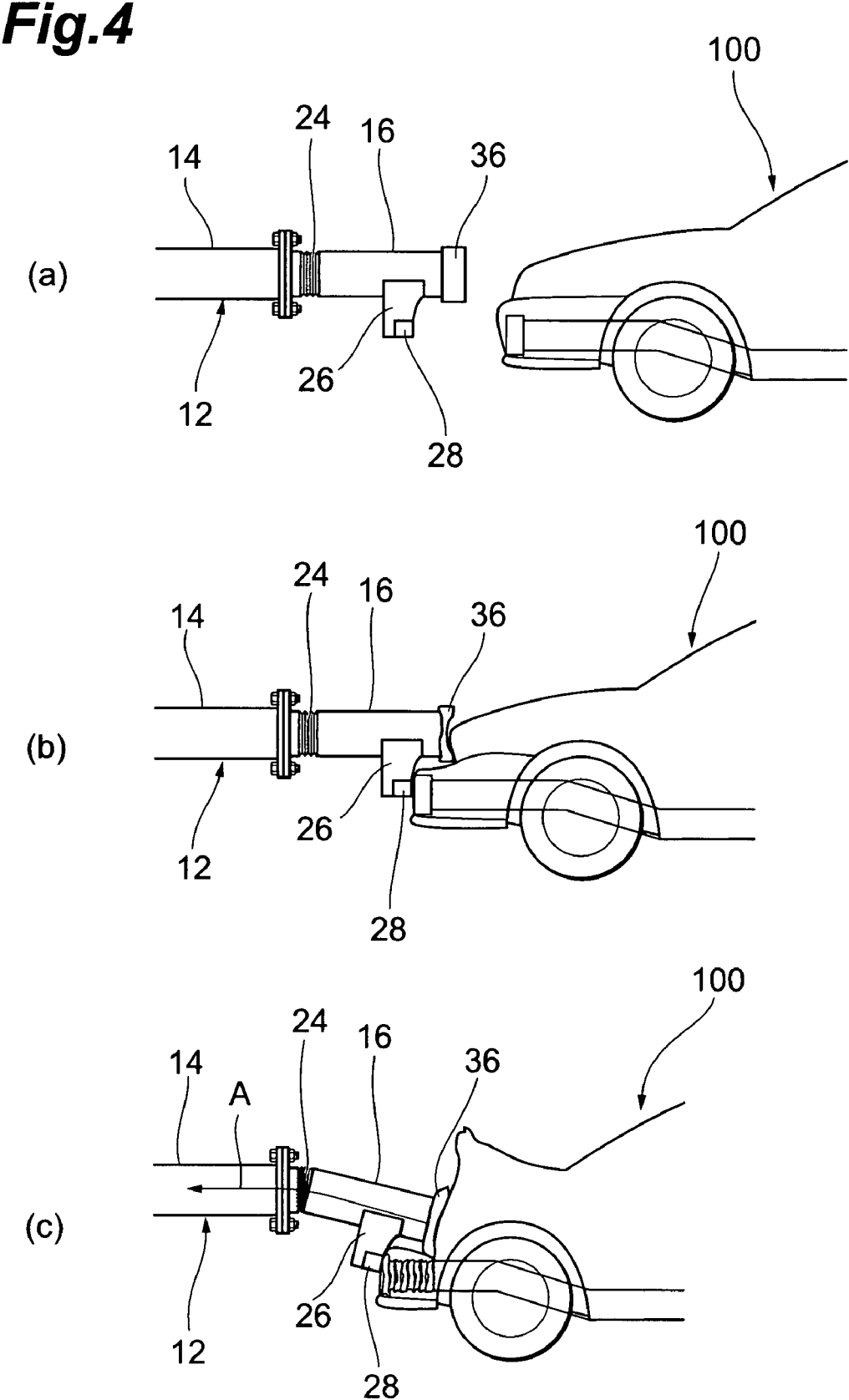
FIG. 4(a) is a lateral view of an example of a vehicle body structure of the present disclosure before collision with a vehicle having a lower bumper height than that of a host vehicle.
FIG. 4(b) is a lateral view, similar to FIG. 4(a), showing initial collision with a vehicle having a lower bumper height than that of a host vehicle.
FIG. 4(c) is a lateral view, similar to FIGS. 4(a) and 4(b), showing after initial collision with a vehicle having a lower bumper height than that of a host vehicle.

Therefore, in the event that the host vehicle collides with another vehicle 100 having the bumper height lower than that of the host vehicle, as shown in FIG. 4 (a), the bumper and front side members of the opponent vehicle 100 come to collide with the pendent members 26 and cross member 28 to push the pendent members 26 backward. This results in bending the flexural portions 24, so that the front end sides of the front end portions 16 of the front side members 12 anterior to the flexural portions 24 are bent downward, as shown in FIG. 4 (c). This results in converting the collision energy into energy of bending the flexural portions 24, whereby the impact absorption is achieved in the simple configuration in the event of the collision with the vehicle 100 having the bumper height lower than that of the host vehicle. Since the load is transmitted through the downwardly bent front end portions 16 of the front side members 12 to the main body portions 14 behind them, as indicated by an arrow A in FIG. 4 (c), the absorption of impact can be adequately achieved by the front side members 12.

Particularly, since the pendent members 26 are supported only at the base end thereof on the front end portions 16 of the front side members 12, the front end portions 16 can be promptly bent downward without impeding displacement of the pendent members 26.

Since each pendent member 26 is constructed separately from the front end portion 16 of the front side member 12, production is easy. In addition, since each pendent member 26 has the same width as the front end portion 16 and since the base end thereof is fitted in the recess 34 of the front end portion 16 so as to be flush with the side faces 16a of the front end portion 16, the load exerted on the pendent member 26 is efficiently transmitted from the side faces 26a of the pendent member 26 to the side faces 16a of the front end portion 16, so that the front end portion 16 of the front side member 12 can be more reliably bent downward.

Since the cross member 28 is laterally suspended between the pair of pendent members 26, the load is transmitted through the cross member 28 to the pendent members 26 even in the event that the host vehicle collides in the part other than the pendent members 26 in the vehicle width direction, with the opponent vehicle; therefore, the front end portions 16 of the front side members 12 are reliably bent downward. Particularly, since the cross member 28 is received from its back by the receivers 32 of the pendent members 26, the load exerted on the cross member 28 is more reliably transmitted to the pendent members 26.

Figure 5:
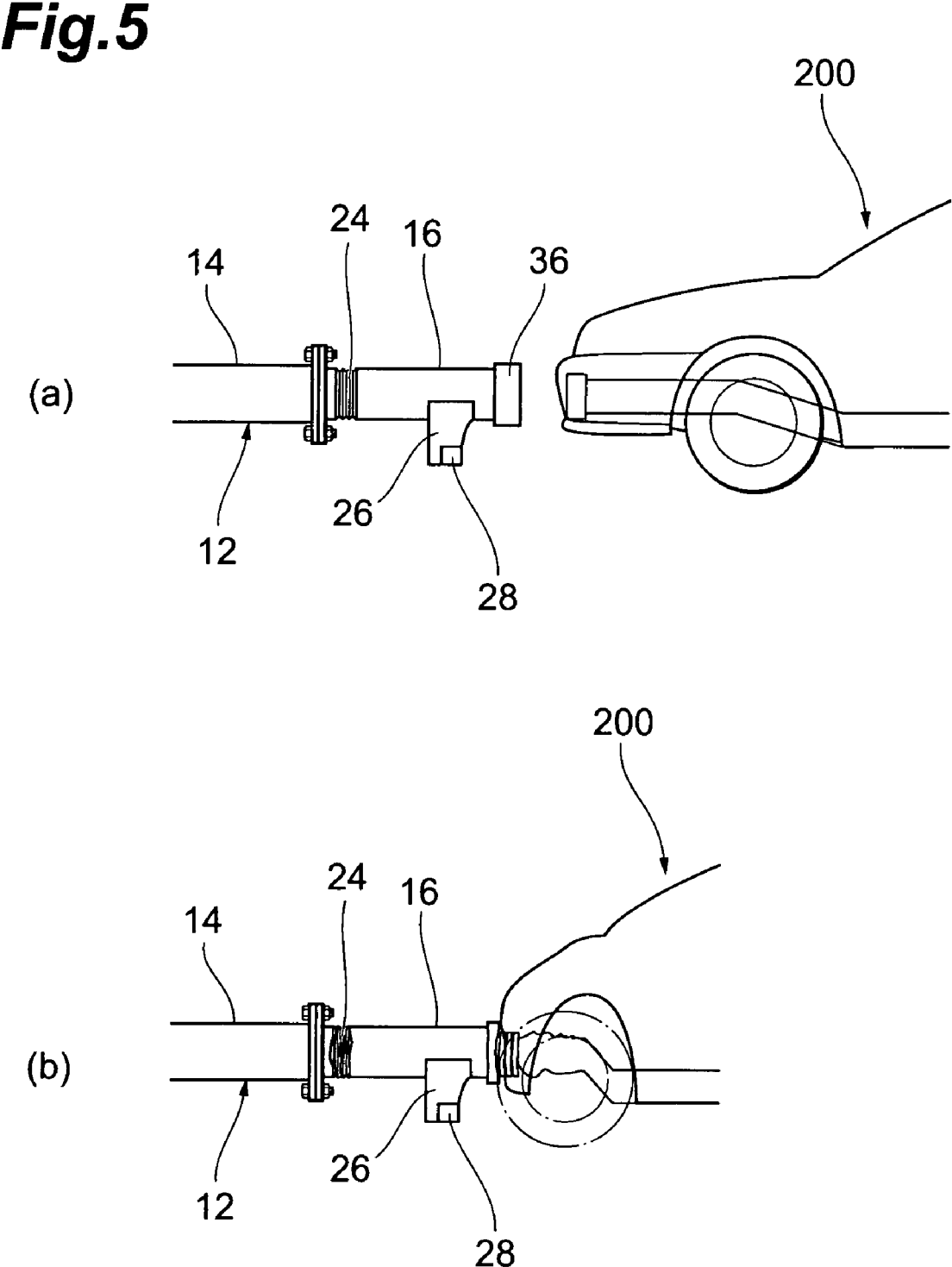
FIG. 5(a) is a lateral view of an example of a vehicle body structure of the present disclosure before collision with a vehicle having a bumper height approximately equal to that of a host vehicle.
FIG. 5(b) is a lateral view, similar to FIG. 5(a), showing collision with a vehicle having a bumper height approximately equal to that of a host vehicle.
Figure 6:
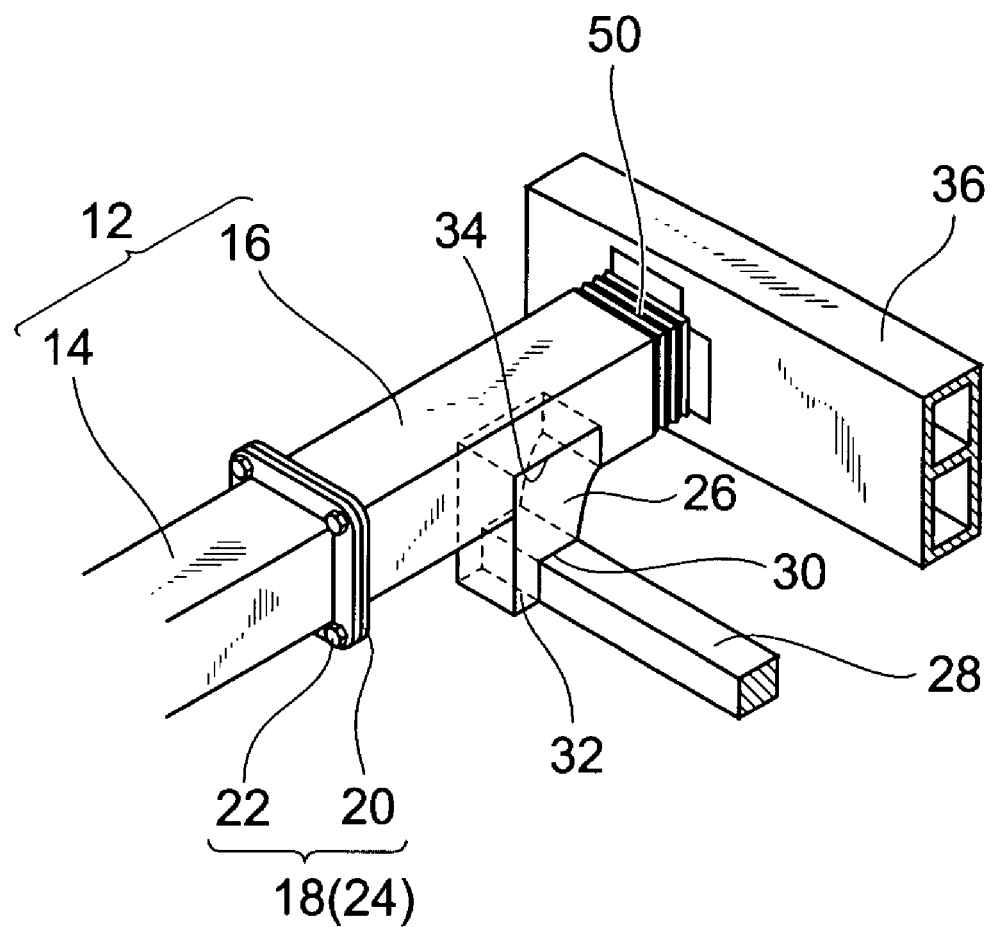
FIG. 6 is a perspective view showing a major part of a front structure of a vehicle body in a car according to the second embodiment.

FIG. 5 is a drawing showing a situation of a collision with a vehicle 200 having the bumper height approximately equal to that of the host vehicle. Since this case is the collision situation in which the front side members of the two vehicles are not off each other, the flexural portions 24 are deformed in the normal buckling mode, as shown in FIG. 5 (b), and the front side members 12 absorb the collision energy. At this time, there is no possibility that the pendent members 26 and cross member 28 adversely affect the deformation of the front end portions 16.

Second Embodiment

Next, the second embodiment of the present invention will be described. The same elements as in the first embodiment will be denoted by the same reference symbols, without redundant description.

The front structure of the vehicle body according to the present embodiment is similar to that of the first embodiment described above, in that each front side member 12 has the main body portion 14 and front end portion (outer end portion) 16, but is different from the first embodiment in that the flexural portion 24 is not constructed of the beads described in the first embodiment, but is constructed of the coupling portion 18 between the main body portion 14 and the front end portion 16.

More specifically, by adjusting the rupture strengths of the bolt-nut mechanism 22 and flanges 20 and adjusting the coupling force in the coupling portion 18, the anteroposterior bending strength of the pendent member 26 is set to be greater than the vertical bending strength (i.e., rupture strength) of the flexural portion 24. The flange parts 20 of the rectangular contour are fastened together at four locations near the corners by the bolt-nut mechanism 22, and a fastening force at the two upper locations is preferably smaller than that at the two lower locations. This facilitates rupture in the upper part of the coupling portion 18. In the present embodiment, beads 50 for absorption of energy of mild collision are provided at the tip of the front end portion 16.

Figure 7:
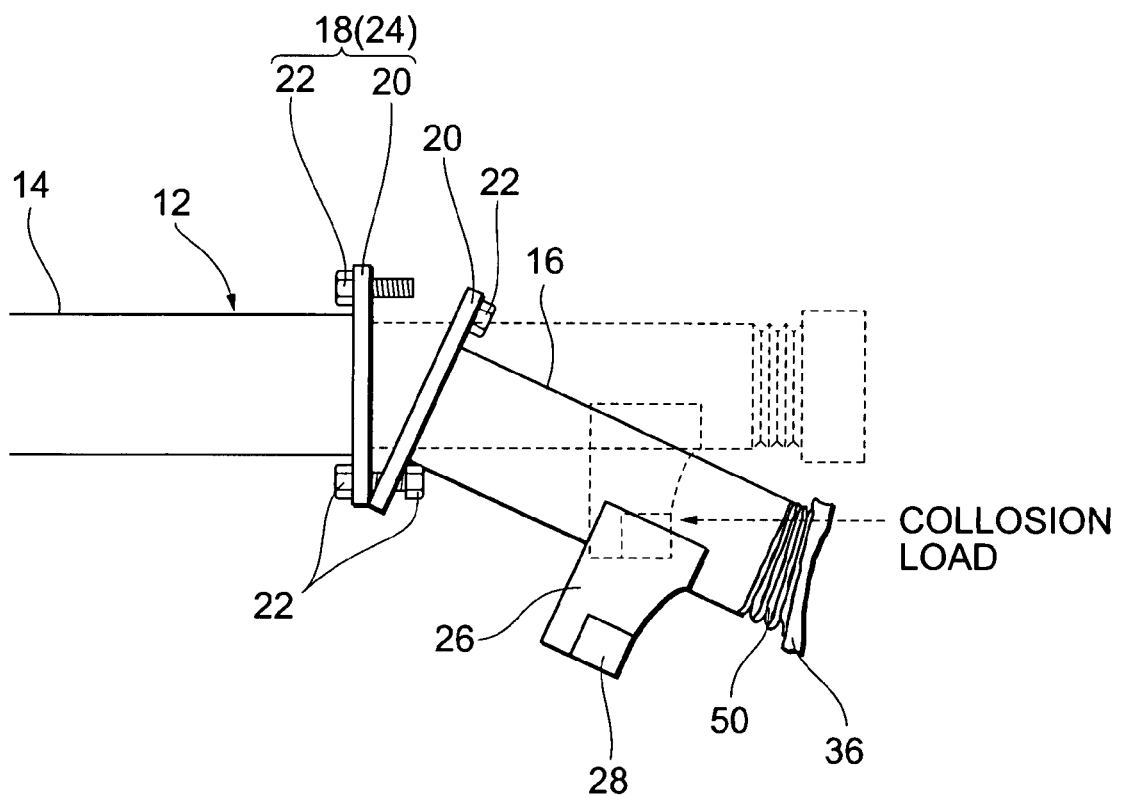
FIG. 7 is a drawing for explaining a state of deformation of a front end part of a front side member in the event that a collision load is exerted on a pendent member.

In the front structure of the vehicle body according to the present embodiment, when a backward collision load is exerted on the pendent member 26 as indicated by a dashed line in FIG. 7, a downward bending moment also acts to cause bending (or rupture) in the coupling portion 18 as the flexural portion 24 and the front end portion 16 is bent downward, as indicated by solid lines in FIG. 7. In this manner, the downward bending of the front end portion 16 of the front side member 12 can be readily realized through the rupture of the coupling portion 18.

When the fastening force in the upper part of the coupling portion 18 is smaller than that in the lower part, it becomes easier to cause rupture from the upper part of the coupling portion 18 and it facilitates the downward bending of the front end portion 16 of the front side member 12.

Figure 8:
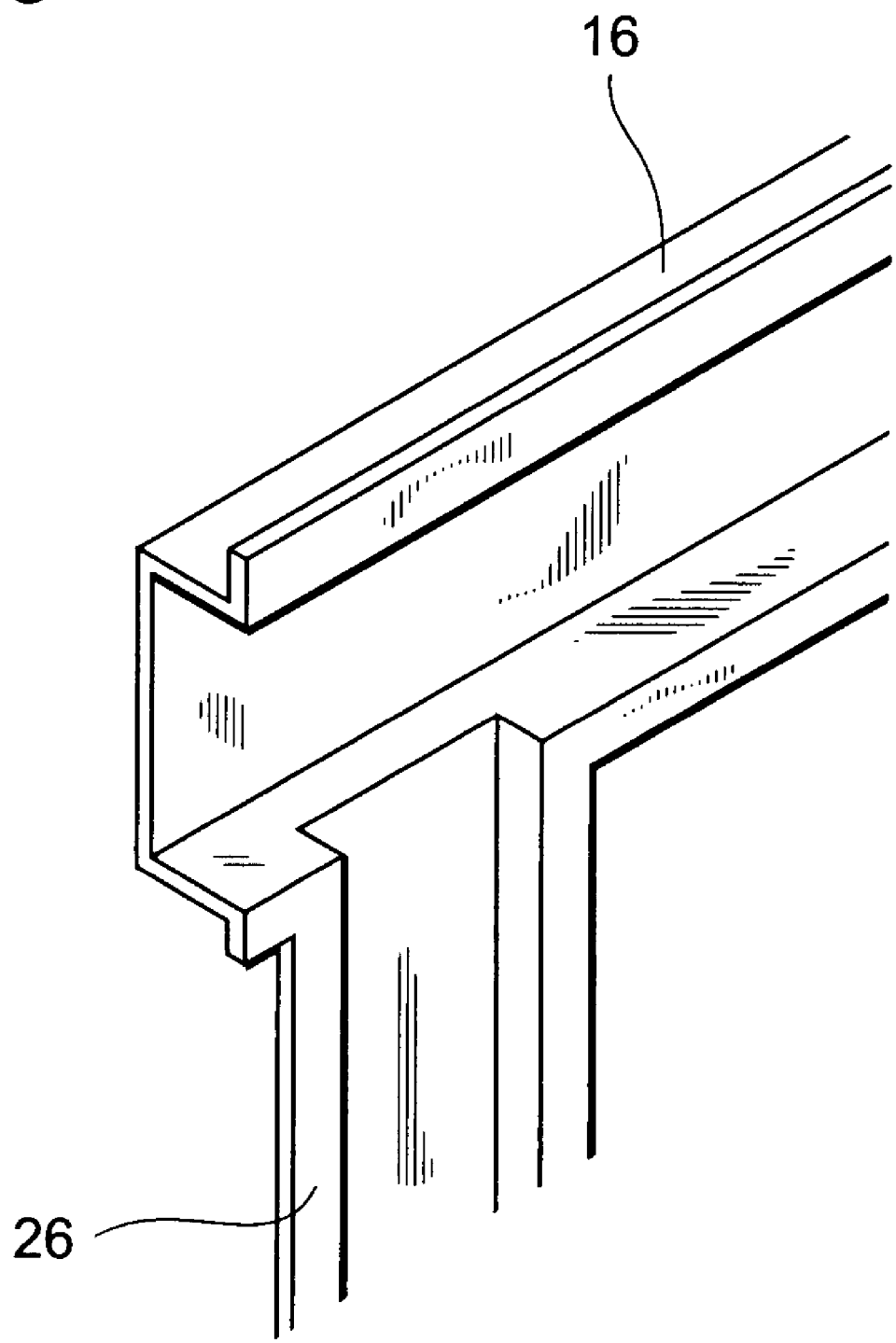
FIG. 8 is a drawing showing a state in which a front end part of a front side member and a pendent member are integrally formed.

The present invention can be modified in many ways, without having to be limited to the above-described embodiments. For example, the foregoing embodiments showed the configuration wherein the pendent member 26 was constructed separately from the front end portion 16 of the front side member 12, but the pendent member 26 may be constructed integrally with the front side member 12, as shown in FIG. 8. This configuration permits the load exerted on the pendent member 26 to be more securely transmitted to the front side member 12 and permits the front end portion 16 of the front side member 12 to be more reliably bent downward, than in the case where the pendent member 26 formed as a separate body is joined by welding or the like.

Figure 9:
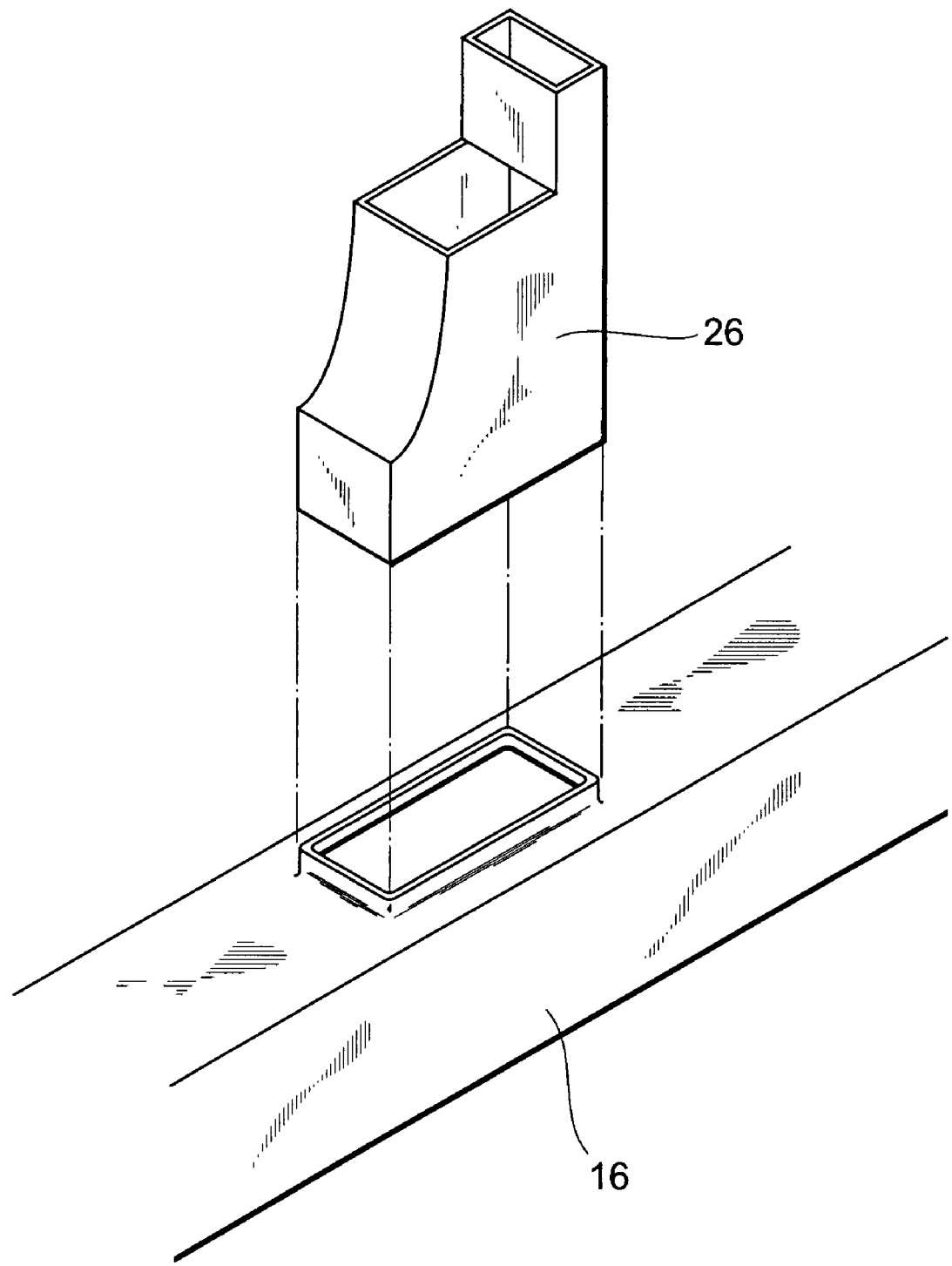
FIG. 9 is a drawing for explaining a modification example of a joining relation between a front end part of a front side member and a pendent member.
Figure 10:
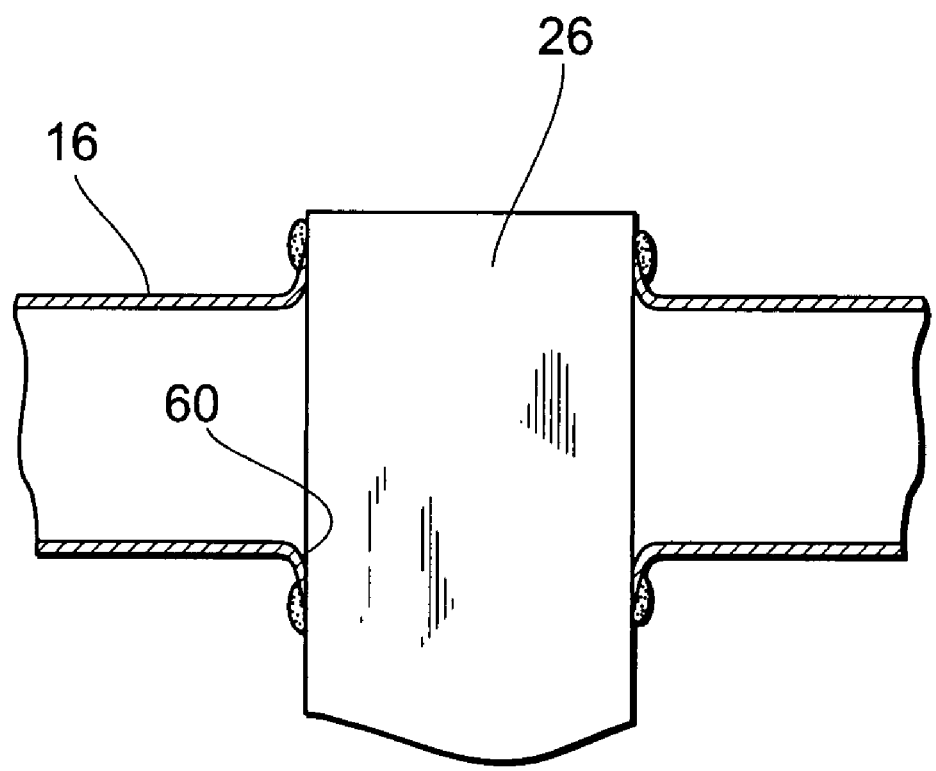
FIG. 10 is a drawing for explaining another modification example of a joining relation between a front end part of a front side member and a pendent member.

The foregoing embodiments described the configuration wherein the pendent member 26 constructed separately from the front end portion 16 of the front side member 12 was fitted in the recess 34, but the pendent member 26 may be joined to the lower surface of the front end portion 16 simply by welding or the like, as shown in FIG. 9. Furthermore, as shown in FIG. 10, the pendent member 26 may be arranged to penetrate through a through hole 60 vertically bored through the front end portion 16, and the pendent member 26 is joined thereto by welding or the like. This facilitates a manufacturing work.

The second embodiment showed the configuration wherein the front end portion 16 was arranged to break away from the main body portion 14 by adjusting the fastening forces in the coupling portion 18, but the front structure may also be so arranged that the front end portion 16 breaks away from the main body portion 14 by an electric breaking mechanism based on detection with a sensor.

The foregoing embodiments described the front structures of the vehicle body, but the present invention is also applicable to the rear structure of the vehicle body. The present invention is not applicable only to big-size cars, but also applicable to all kinds of vehicles.

Third Embodiment

Figure 11:
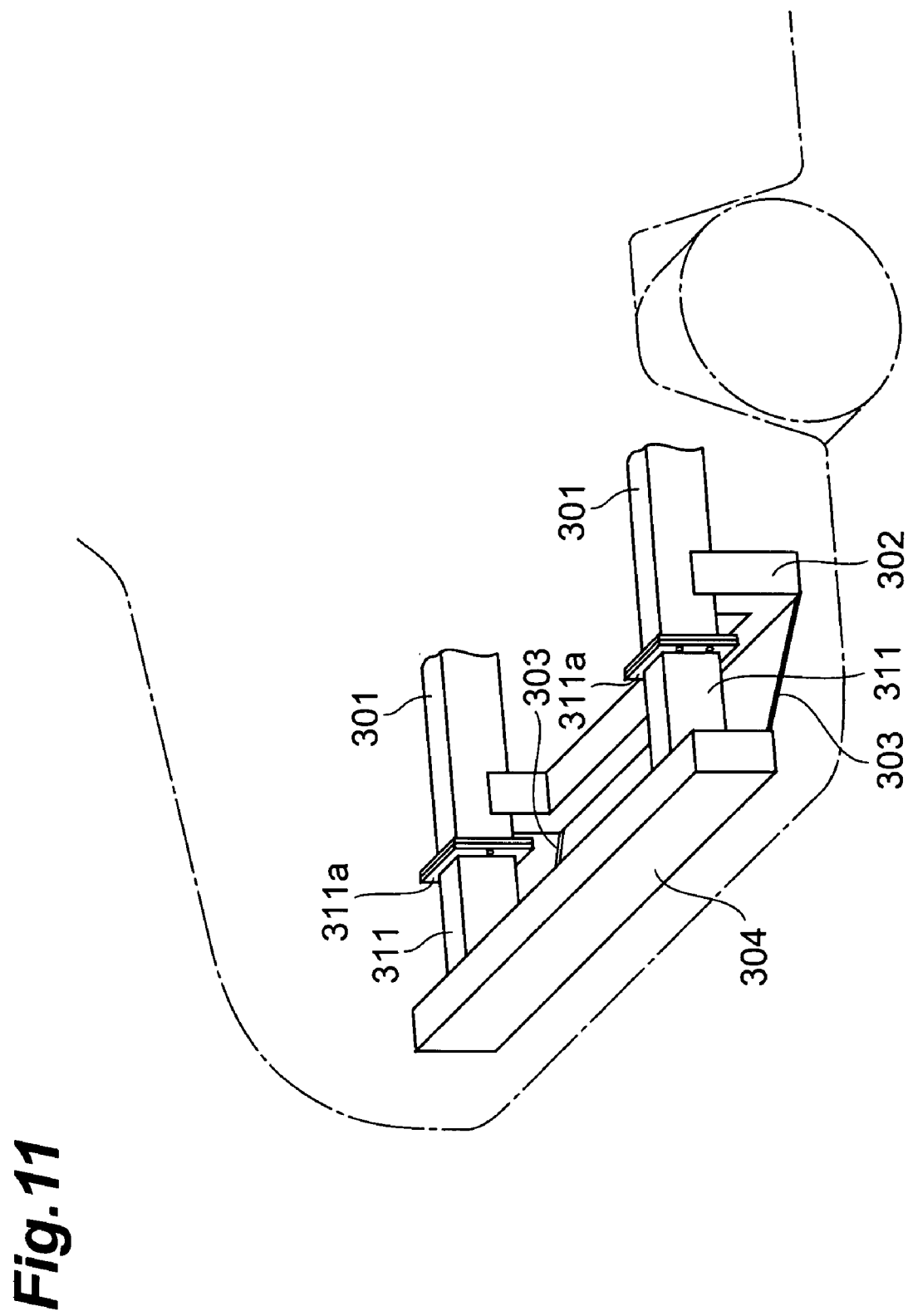
FIG. 11 is a schematic diagram of a configuration of a vehicle body structure according to the third embodiment of the present invention.

FIG. 11 is a schematic drawing showing a configuration of a vehicle body structure according to the third embodiment of the present invention.

As shown in FIG. 11, the vehicle body structure according to the present embodiment is a structure of a vehicle body to be installed in a vehicle, and is provided with side members 301, a lower cross member 302, and wires 303. The side members 301 are framework members extending in the anteroposterior direction of the vehicle, and are provided one on each of the left and right sides of the vehicle, for example. An energy absorber 311 is provided at the tip of each side member 301. The energy absorber 311 has a structure that absorbs the collision energy in the event of a collision of the vehicle and that is deformed easier with application of external force than the other part of the side member 301.

This energy absorber 311 is constructed, for example, of a member having a lower strength than the other part of the side member 301 or of a steel material having the thickness smaller than the other part of the side member 301, and is structured so as to be easier to deform than the other part of the side member 301. When a collision load is exerted from the front of the vehicle, the energy absorbers 311 are buckled before the other part of the side members 301 and absorb the collision energy by deformation based on the buckling. On that occasion, the energy absorbers 311 function as buckling portions having the buckling strength smaller than that of the other part of the side members 301.

A flange 311a is formed in the rear end portion of each energy absorber 311. Each energy absorber 311 is flange-coupled through this flange 311a by screwing to the part of the side member 301 behind it. A bumper reinforcement 304 is provided at the tips of energy absorbers 311. The bumper reinforcement 304 is a member for efficiently dispersing the collision load to the left and right side members 1, is installed along the vehicle width direction, and is attached to the left and right energy absorbers 311, 311.

The lower cross member 302 is a lower framework member disposed below the side members 301. This lower cross member 302 functions as a pendent member hung on the lower parts of the side members 301. This lower cross member 302 is attached at its both ends to the left and right side members 301 and is installed along the vehicle width direction. The lower cross member 302 is preferably arranged so that the base ends thereof are inserted into the lower parts of the side members 301 and attached thereto. As so attached, the lower cross member 302 becomes less likely to break away from the side members 301 even with application of horizontal force.

A wire 303 is connected between the tip of each side member 301 and the lower cross member 302. The wire 303 functions as a tension transmitting member for transmitting tension without transmitting compression, between the side member 301 and the lower cross member 302. One end of the wire 303 is attached to the bumper reinforcement 304 attached to the tips of the side members 1 and the other end of the wire 303 is attached to the lower part of the lower cross member 304. One end of the wire 303 can also be attached directly to the side member 301 in certain cases. The tension transmitting member may be any other material than the wire 303 as long as it can transmit tension with little transmission of compression; for example, it may be a chain, a reinforced resin fiber material, and so on.

The below will describe the impact absorption upon collision of the vehicle body structure according to the present embodiment.

Figure 12:
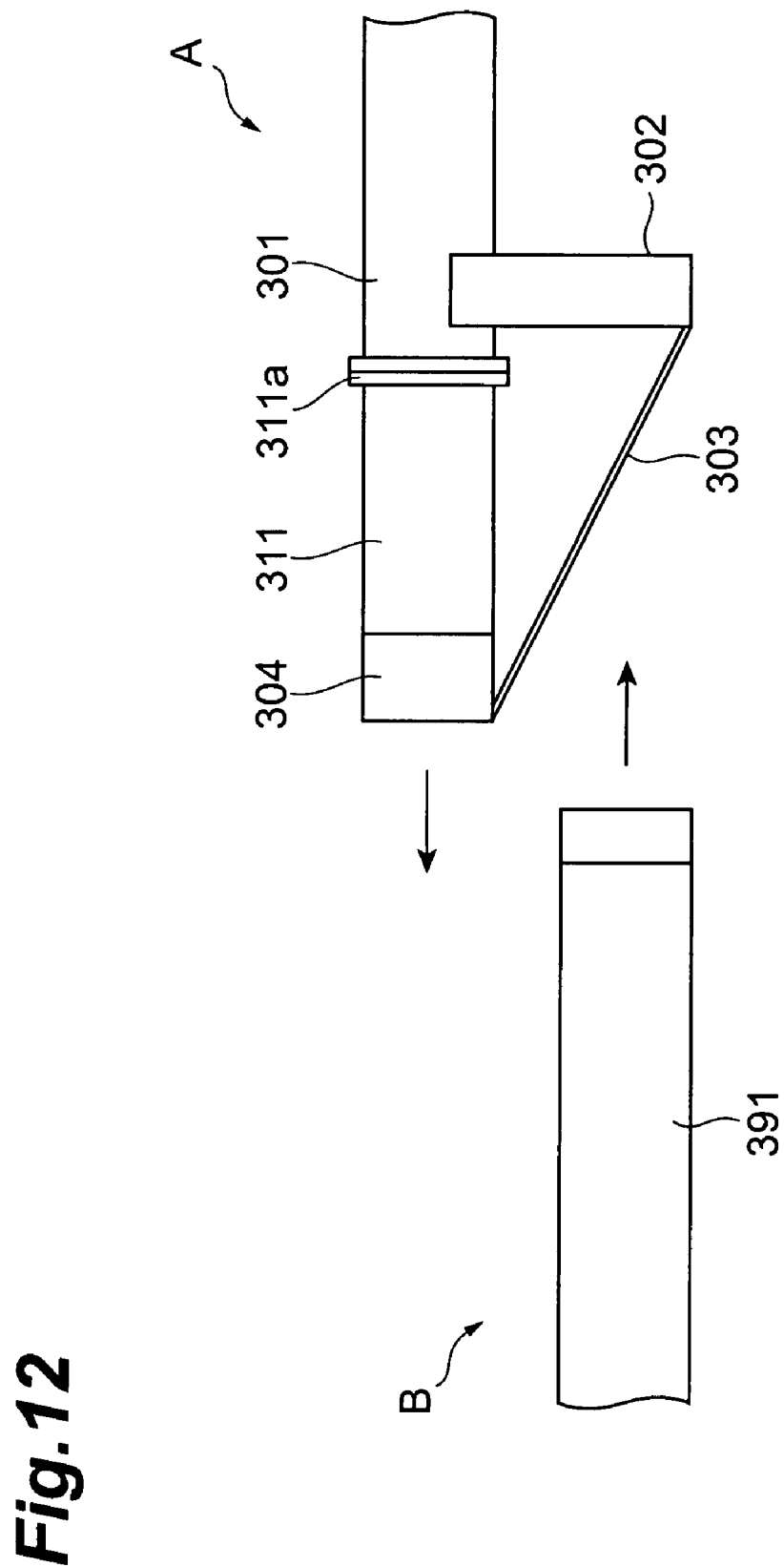
FIG. 12 is an explanatory drawing to illustrate impact absorption in the vehicle body structure of FIG. 11.

FIGS. 12 to 15 are explanatory drawings about the impact absorption upon collision of the vehicle body structure according to the present embodiment. When a vehicle A with the vehicle body structure according to the present embodiment collides head-on with a vehicle B having a lower vehicle height, as shown in FIG. 12, a frame 391 of the vehicle B approaches the lower cross member 302 located below the energy absorbers 311.

Figure 13:
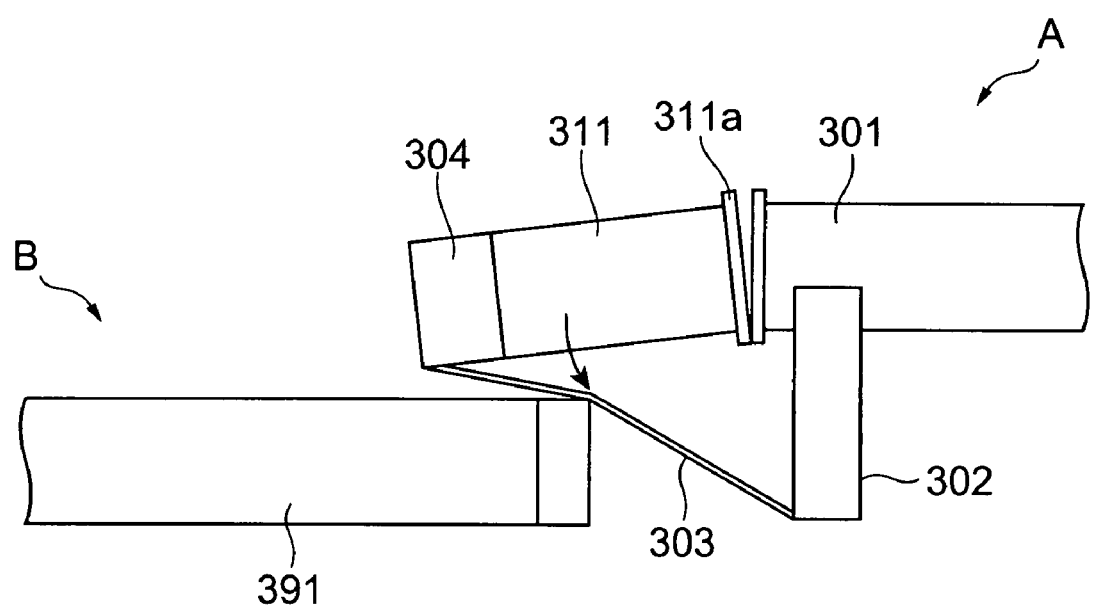
FIG. 13 is an explanatory drawing to illustrate impact absorption in the vehicle body structure of FIG. 11.

As the vehicle B further approaches the vehicle A, as shown in FIG. 13, the frame 391 of the vehicle B comes to touch the wires 303 before contact with the lower cross member 302. At this time, the collision load is exerted on the wires 303. On that occasion, the wires 303 transmit the collision load as tension to the bumper reinforcement 304 at the tips of the side members 301 and to the lower cross member 302.

This tension downwardly bends the energy absorbers 311 at the tips of the side members 301. The impact of the collision can be absorbed by the bending deformation on that occasion. At this time, when the collision load is small below a predetermined value, there is no damage to the lower cross member 302 and to the side members 301 behind the connected portions of the lower cross member 302.

Figure 14:
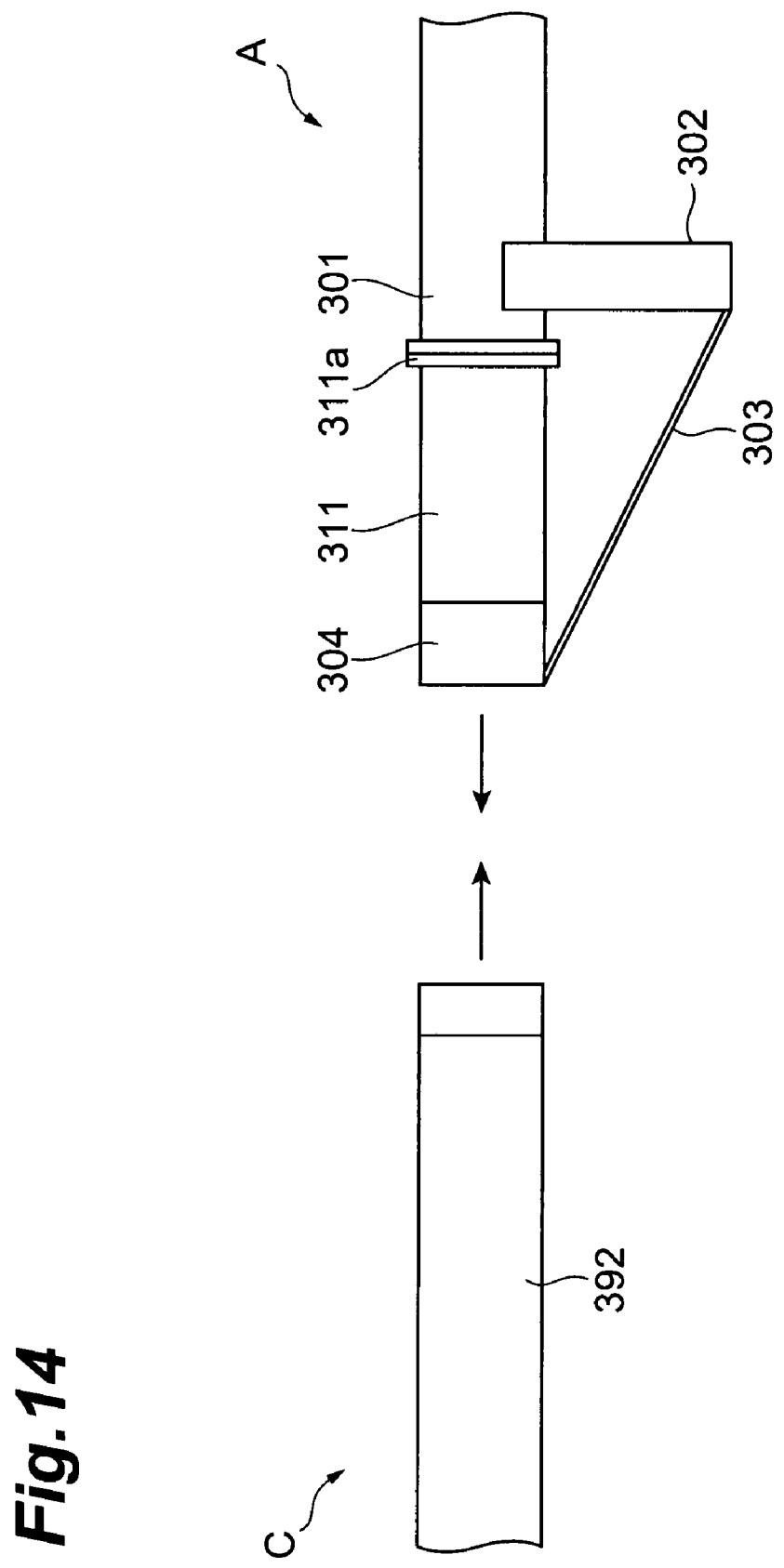
FIG. 14 is an explanatory drawing to illustrate impact absorption in the vehicle body structure of FIG. 11.

When the vehicle A with the vehicle body structure according to the present embodiment collides head-on with a vehicle C having the same vehicle height, as shown in FIG. 14, a frame 392 of the vehicle C approaches the side members 301.

Figure 15:
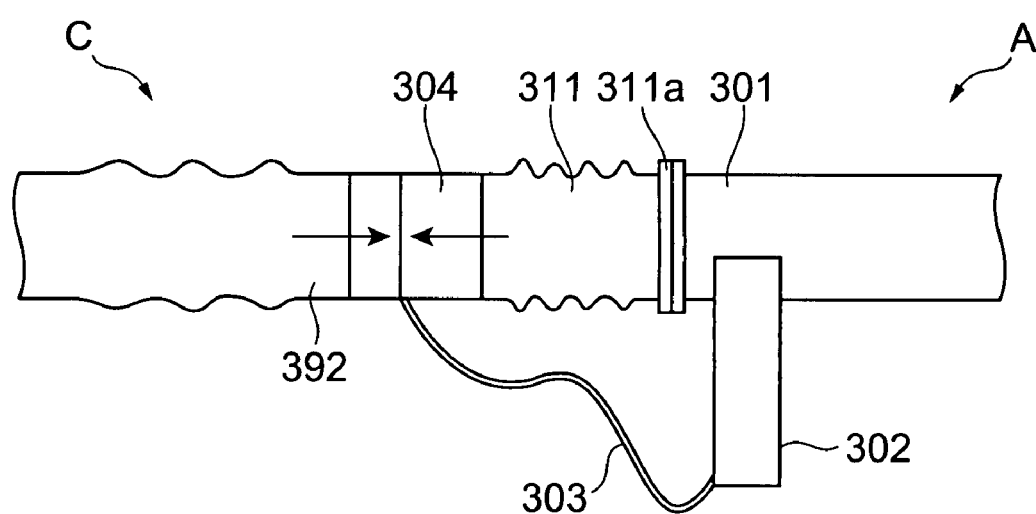
FIG. 15 is an explanatory drawing to illustrate impact absorption in the vehicle body structure of FIG. 11.

As the vehicle B further approaches the vehicle A, as shown in FIG. 15, the frame 392 of the vehicle C comes to butt on the lower cross member 302 at the tips of the side members 301. This results in transmitting the collision load in the axial direction of the side members 301 and compressively deforming the lower-strength energy absorbers 311 to absorb the impact.

On the other hand, when the frame 392 of the vehicle C butts on the lower cross member 302, the collision load is transmitted to the wires 303. However, since the wires 303 transmit only tension without transmitting compression, the collision load is not transmitted through the wires 303 to the lower cross member 302 and the side members 301. For this reason, the lower cross member 302 or the side members 301 are prevented from being broken by the collision load transmitted through the wires 303.

In the vehicle body structure according to the present embodiment, as described above, the wires 303 for transmitting tension without transmitting compression are connected between the tips of the side members 301 and the lower cross member 302; therefore, when a collision load is exerted on the wires 303 in the event of a collision with a vehicle having the lower vehicle height than that of the host vehicle, the wires 303 transmit the tension to the tips of the side members 301 to deform the tip end portions of the side members 301 downward, whereby the impact absorption can be efficiently achieved in the front part of the vehicle.

Since the tip end portions of the side members 301 undergo bending deformation in the initial stage of the collision, the overhang of the host vehicle becomes shorter. This increases a time before the frame of the host vehicle such as the side members 301 arrives at the A-pillar of the opponent vehicle upon collision, which reduces damage to the opponent vehicle and enhances safety.

On the other hand, when the collision load is exerted on the side members 301, e.g., in the event of a collision with a vehicle having the same vehicle height as the host vehicle, the side members 301 are compressively deformed, but no compression is transmitted from the side members 301 to the lower cross member 302 through the wires 303. For this reason, no deformation occurs in the lower cross member 302 and the rear portions behind the lower cross member 302 in the event of a mild collision. Therefore, repair is needed only in the tip end portions of the side members 301 and it reduces repair cost. Since the wires 303 themselves are not damaged by compressive load, there is no need for repair or the like and it reduces repair cost.

The provision of the wires 303 strengthens the connection and support of the bumper reinforcement 304 located far from the center of gravity of the vehicle. This improves steering stability and vibration noise characteristic.

Fourth Embodiment

The below will describe a vehicle body structure according to the fourth embodiment of the present invention.

Figure 16:
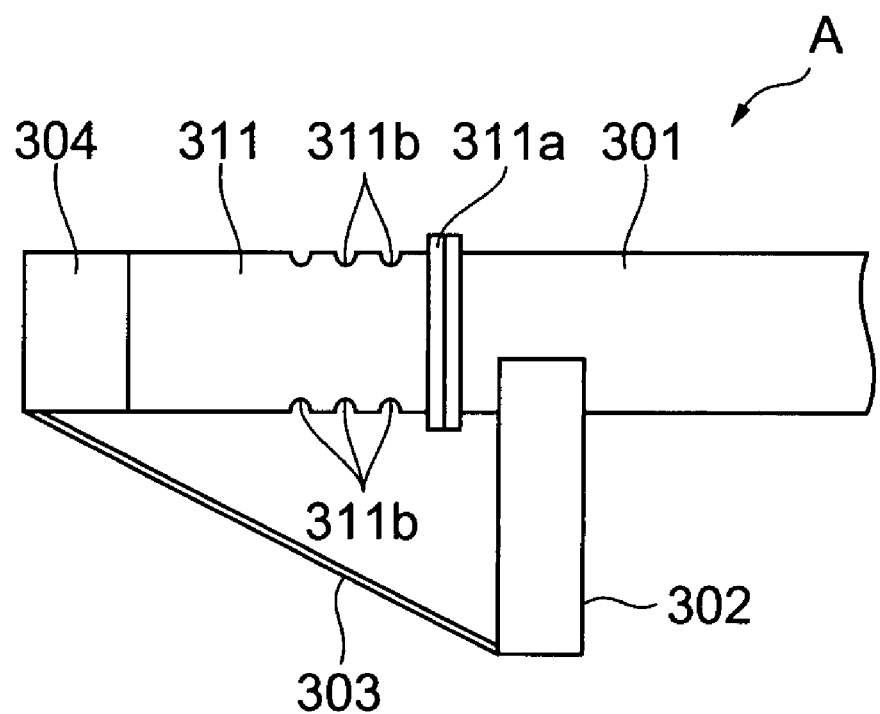
FIG. 16 is a schematic diagram of a configuration of a vehicle body structure according to the fourth embodiment of the present invention.
Figure 17:
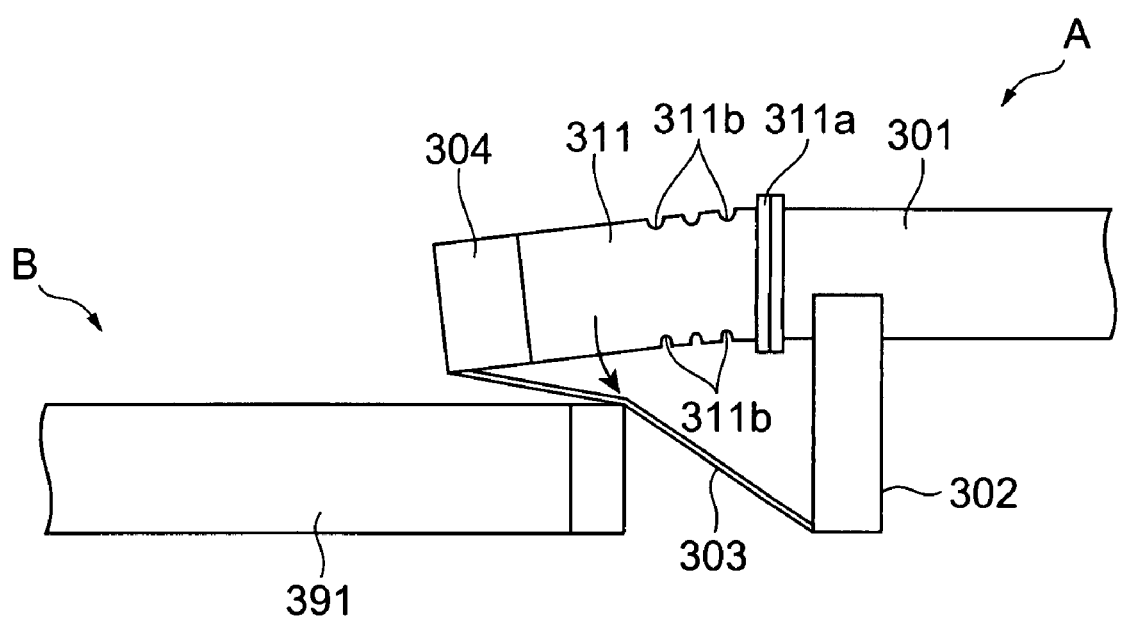
FIG. 17 is an explanatory drawing to illustrate impact absorption in the vehicle body structure of FIG. 16.

FIGS. 16 and 17 are schematic explanatory drawings showing the vehicle body structure according to the present embodiment. As shown in FIG. 16, the vehicle body structure according to the present embodiment is constructed in much the same configuration as the vehicle body structure of the third embodiment described above, but is different from the vehicle body structure of the third embodiment in that each side member 301 is provided with a flexural portion 311b.

The flexural portion 311b makes the bending strength on the tip end side of the side member 301 smaller than that on the back side of the side member 301 behind the connection part to the lower cross member 302, and is formed, for example, as grooves formed in the energy absorber 311. Namely, the flexural portion 311b is provided as grooves engraved along the vehicle width direction in the upper face and lower face of the energy absorber 311. As this flexural portion 311b is formed, the side member 301 becomes more likely to bend as beginning at the flexural portion 311b with application of a bending load on the side member 301, and the tip end side of the side member 301 becomes easier to bend.

For example, when a vehicle A with the vehicle body structure according to the present embodiment collides head-on with a vehicle B having a lower vehicle height, as shown in FIG. 17, the frame 391 of the vehicle B comes to touch the wires 303 before contact with the lower cross member 302. At this time, a collision load is exerted on the wires 303 and the wires 303 transmit the collision load as tension to the bumper reinforcement 304 at the tips of the side members 301 and to the lower cross member 302.

This tension results in exerting a bending load on the tip end portions of the side members 301. Then the side members 301 are bent downward as beginning at the flexural portions 311b, and the impact of the collision is absorbed by the bending deformation on that occasion. When the collision load on that occasion is small below a predetermined value, there is no damage to the lower cross member 302 and the side members 301 behind the connection portions of the lower cross member 302.

As described above, the vehicle body structure of the present embodiment also achieves the action and effect similar to those in the aforementioned third embodiment. In addition thereto, the side members 301 are more reliably bent on the tip end side thereof upon collision to implement the impact absorption. Therefore, the impact absorption can be efficiently effected in the front part of the vehicle and it reduces repair cost. When the flexural portion 311b is formed by engraving of grooves, the groove part can serve as a start point of buckling upon collision and functions as a buckling portion.

The foregoing third and fourth embodiments described the front structures of the vehicle, but they may be applied to structures for achieving impact absorption upon back collision with another vehicle while the energy absorbers 311, lower cross member 302, etc. are provided in the rear part of the vehicle.

Each of the above embodiments shows an example of the vehicle body structure according to the present invention. The vehicle body structures according to the present invention are not limited to those described above, and may be those modified without change in the essence described in each of claims.

INDUSTRIAL APPLICABILITY

The present invention is applicable to vehicles with the side members and realizes the impact absorption by the side members in the simple configuration even in the event of collision between vehicles having different bumper heights.

The invention claimed is:

1. A vehicle body structure for a front part or a rear part of a vehicle, comprising:
a side member extending in an anteroposterior direction of the vehicle, the side member comprising a first portion, a second portion, and a coupling portion connecting the first portion and the second portion, the first portion extending between a bumper reinforcing member and the coupling portion in the anteroposterior direction of the vehicle, and the second portion extending from the coupling portion away from the first portion in the anteroposterior direction of the vehicle;

wherein the bumper reinforcing member is connected to a bumper end of the first portion;

a flexural portion provided on a coupling end of the first portion adjacent to the coupling portion, the flexural portion having a vertical bending strength smaller than that of the bumper end and smaller than that of the second portion; and a pendent member connected to a lower part of the first portion between the bumper end and the coupling end and having an anteroposterior bending strength larger than the bending strength of the flexural portion.

2. The vehicle body structure according to claim 1, wherein the pendent member is supported only at a base end of the pendent member on the lower part of the first portion.

3. The vehicle body structure according to claim 1, wherein the pendent member is constructed separately from the first portion and has the same width as the first portion, and wherein a base end of the pendent member is fitted in a recess formed in a region from a side face to a lower face of the first portion so as to be flush with the side face of the first portion.

4. The vehicle body structure according to claim 1, where the pendent member is constructed integrally with the first portion.

5. The vehicle body structure according to claim 1, wherein the coupling portion comprises flanges connecting the first portion and the second portion and a bolt-nut mechanism tightened through the flanges.

6. The vehicle body structure according to claim 1, comprising a cross member laterally suspended between a pair of said pendent members.

7. The vehicle body structure according to claim 6, wherein each pendent member has a receiver for receiving a back of the cross member.

8. The vehicle body structure according to claim 1, further comprising a tension transmitting member connected between the bumper end of the first portion and the pendent member and arranged to transmit tension without transmitting compression.

9. The vehicle body structure according to claim 8, wherein a second flexural portion is provided on the bumper end of the first portion adjacent to the bumper reinforcing member.

10. The vehicle body structure according to claim 8, wherein the side member has a buckling portion located on the bumper end of the first portion, and the buckling portion having a buckling strength smaller than the coupling end of the first portion.

11. The vehicle body structure according to claim 8, wherein the tension transmitting member is comprised of wire.

* * * * *

UNITED STATES PATENT AND TRADEMARK OFFICE
CERTIFICATE OF CORRECTION

| | | |
|---|---|---|
| PATENT NO. | : 7,896,428 B2 | Page 1 of 1 |
| APPLICATION NO. | : 11/883186 | |
| DATED | : March 1, 2011 | |
| INVENTOR(S) | : Koji Tamakoshi and Naoya Kosaka | |

It is certified that error appears in the above-identified patent and that said Letters Patent is hereby corrected as shown below:

Title page, item 57 (abstract), lines 5-6, "portions of the members" should read --portions of the side members--;

Claim 10, col. 12, line 21, delete "and" before "the buckling portion".

Signed and Sealed this
Thirty-first Day of May, 2011

David J. Kappos
*Director of the United States Patent and Trademark Office*